US011562738B2

(12) United States Patent
Al Bawab et al.

(10) Patent No.: US 11,562,738 B2
(45) Date of Patent: Jan. 24, 2023

(54) ONLINE LANGUAGE MODEL INTERPOLATION FOR AUTOMATIC SPEECH RECOGNITION

(71) Applicant: Microsoft Technology Licensing, LLC, Redmond, WA (US)

(72) Inventors: Ziad Al Bawab, Foster City, CA (US); Anand U Desai, Sunnyvale, CA (US); Shuangyu Chang, Davis, CA (US); Amit K Agarwal, Redmond, WA (US); Zoltan Romocsa, Kenmore, WA (US); Veljko Miljanic, Bellevue, WA (US); Aadyot Bhatnagar, San Jose, CA (US); Hosam Khalil, Redmond, WA (US); Christopher Basoglu, Everett, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 116 days.

(21) Appl. No.: 16/665,574

(22) Filed: Oct. 28, 2019

(65) Prior Publication Data
US 2020/0349930 A1 Nov. 5, 2020

Related U.S. Application Data

(60) Provisional application No. 62/843,481, filed on May 5, 2019.

(51) Int. Cl.
*G10L 15/00* (2013.01)
*G10L 15/18* (2013.01)
(Continued)

(52) U.S. Cl.
CPC .......... *G10L 15/193* (2013.01); *G06Q 10/107* (2013.01); *G06Q 10/1095* (2013.01);
(Continued)

(58) Field of Classification Search
CPC ....... G10L 15/183; G10L 15/22; G10L 15/26; G10L 15/146; G10L 15/187;
(Continued)

(56) References Cited

U.S. PATENT DOCUMENTS 9,934,775 B2   4/2018   Raitio et al.
9,972,304 B2   5/2018   Paulik et al.
(Continued)

FOREIGN PATENT DOCUMENTS

WO   2016126767 A1   8/2016

OTHER PUBLICATIONS

"Non-Final Office Action Issued in U.S. Appl. No. 16/531,435", dated Mar. 30, 2021, 14 Pages.
(Continued)

*Primary Examiner* — Michael Ortiz-Sanchez
(74) *Attorney, Agent, or Firm* — Workman Nydegger

(57) ABSTRACT

A system includes acquisition of a domain grammar, determination of an interpolated grammar based on the domain grammar and a base grammar, determination of a delta domain grammar based on an augmented first grammar and the interpolated grammar, determination of an out-of-vocabulary class based on the domain grammar and the base grammar, insertion of the out-of-vocabulary class into a composed transducer composed of the augmented first grammar and one or more other transducers to generate an updated composed transducer, composition of the delta domain grammar and the updated composed transducer, and application of the composition of the delta domain grammar and the updated composed transducer to an output of an acoustic model.

20 Claims, 12 Drawing Sheets

(51) Int. Cl.
*G10L 15/193* (2013.01)
*G06Q 10/10* (2012.01)
*G10L 15/197* (2013.01)
*G10L 15/22* (2006.01)
*G10L 15/30* (2013.01)

(52) U.S. Cl.
CPC ............ *G10L 15/197* (2013.01); *G10L 15/22* (2013.01); *G10L 15/30* (2013.01)

(58) Field of Classification Search
CPC ..... G10L 15/193; G10L 15/197; G10L 15/30; G10L 2015/085; G10L 15/02; G10L 15/16; G10L 15/1815; G10L 15/32; G10L 2015/088; G10L 15/00; G10L 15/06; G10L 15/063; G10L 15/065; G10L 2015/0633; G10L 2015/0635; G10L 2015/0636; G10L 2015/0638; G10L 15/20; G10L 15/28; G10L 15/34; G10L 15/18; G10L 15/19; G10L 15/14; G10L 15/083; G10L 15/08; G06Q 10/00; G06Q 10/107; G06Q 10/1095; H04M 2201/40; H04M 2203/2061; G06F 40/211; G06F 40/279; G06F 40/56
See application file for complete search history.

(56) References Cited

U.S. PATENT DOCUMENTS

| | | | |
|---|---|---|---|
| 10,217,457 B2 * | 2/2019 | Gilbert | ............... G10L 15/26 |
| 10,388,272 B1 | 8/2019 | Thomson et al. | |
| 10,573,312 B1 | 2/2020 | Thomson et al. | |
| 10,672,383 B1 | 6/2020 | Thomson et al. | |
| 10,867,610 B2 | 12/2020 | Diamant et al. | |
| 10,971,153 B2 | 4/2021 | Thomson et al. | |
| 11,017,778 B1 | 5/2021 | Thomson et al. | |
| 11,145,296 B1 * | 10/2021 | Gandhe | ............... G10L 15/22 |
| 11,145,312 B2 | 10/2021 | Thomson et al. | |
| 2004/0021765 A1 | 2/2004 | Kubala et al. | |
| 2004/0243393 A1 | 12/2004 | Wang et al. | |
| 2009/0099845 A1 | 4/2009 | George | |
| 2010/0268534 A1 | 10/2010 | Kishan Thambiratnam et al. | |
| 2013/0144603 A1 | 6/2013 | Lord et al. | |
| 2014/0222426 A1 * | 8/2014 | Di Fabbrizio | .......... G10L 15/22 704/243 |
| 2015/0106091 A1 | 4/2015 | Larsen et al. | |
| 2015/0336578 A1 | 11/2015 | Lord et al. | |
| 2015/0348547 A1 | 12/2015 | Paulik et al. | |
| 2016/0093300 A1 * | 3/2016 | Begeja | ................ G10L 25/48 704/9 |
| 2016/0171973 A1 * | 6/2016 | Nissan | ................ G10L 15/183 704/244 |
| 2016/0379626 A1 | 12/2016 | Deisher et al. | |
| 2018/0374484 A1 | 12/2018 | Huang et al. | |
| 2019/0341050 A1 | 11/2019 | Diamant et al. | |
| 2020/0175961 A1 | 6/2020 | Thomson et al. | |
| 2020/0175962 A1 | 6/2020 | Thomson et al. | |
| 2020/0175987 A1 | 6/2020 | Thomson et al. | |
| 2020/0243094 A1 | 7/2020 | Thomson et al. | |
| 2020/0349931 A1 | 11/2020 | Al Bawab et al. | |
| 2020/0357388 A1 * | 11/2020 | Zhao | ................ G06N 20/00 |
| 2021/0233530 A1 | 7/2021 | Thomson et al. | |
| 2022/0358912 A1 | 11/2022 | Al Bawab et al. | |

OTHER PUBLICATIONS

"International Search Report and Written Opinion Issued in PCT Application No. PCT/US20/024532", dated Jul. 6, 2020, 11 Pages.
"International Search Report and Written Opinion Issued in PCT Application No. PCT/US20/025092", dated Jul. 29, 2020, 13 Pages.
"Notice of Allowance Issued in U.S. Appl. No. 16/531,435", dated Jan. 19, 2022, 12 Pages.
"Final Office Action Issued in U.S. Appl. No. 16/531,435", dated Aug. 16, 2021, 14 Pages.
U.S. Appl. No. 62/843,481, filed May 5, 2019.
U.S. Appl. No. 17/752,623, filed May 24, 2022.
U.S. Appl. No. 16/531,435, filed Aug. 5, 2019.

* cited by examiner

ONLINE LANGUAGE MODEL INTERPOLATION FOR AUTOMATIC SPEECH RECOGNITION

CROSS-REFERENCE TO RELATED APPLICATIONS

The present application claims priority to U.S. Provisional Patent Application No. 62/843,481, filed May 5, 2019, the contents of which are incorporated herein by reference for all purposes.

BACKGROUND

Computer-implemented speech recognition is becoming increasingly accurate. This accuracy suffers in the case of domain-specific audio such as audio generated during meetings. For example, the speech of meeting participants may include technical terms and meeting-specific jargon which are not easily recognized by generic language models, or base grammars. The use of meeting-specific language models, or domain grammars, which include such terms may improve the accuracy of meeting transcriptions. However, generation and usage of domain grammars for speech recognition presents several difficulties.

According to known speech recognition systems, an HCLG transducer is applied to the output of an acoustic model, where finite-state transducer G represents a domain grammar. Composition of transducer G with an HCL transducer requires substantial disk space, processing power and memory and is therefore typically impractical and unsuitably time-consuming.

Some systems factor grammar G into $G_S$ and $G_A$ such that $G=G_S*G_A$. $G_S$ is smaller than G and can be used to compose and optimize an $HCLG_S$ transducer offline. $HCLG_S$ and $G_A$ are then composed on-demand during decoding. Since the composition of $G_S$ and $G_A$ generates full grammar G, the resulting on-demand-composed transducer will be equivalent to the above-mentioned statically-composed HCLG transducer. Although the factoring of grammar G into $G_S$ and $G_A$ facilitates the composition and optimization of $HCLG_S$, this pre-processing nevertheless consumes many minutes if not hours. Since a domain grammar might not become available until shortly before a meeting, and since prompt or contemporaneous meeting transcription is desired, current systems are unsatisfactory.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments improve domain-specific speech recognition by interpolating a base grammar with a domain grammar and composing a corresponding transducer on-demand to provide recognition of common and out-of-vocabulary words. According to some embodiments, such composition occurs significantly faster than other systems providing dynamic composition based on a single large grammar. Some embodiments are therefore compatible with scenarios in which transcription is required shortly after acquisition of a domain-specific grammar. Moreover, for a same domain grammar, some embodiments exhibit an 80-85% improvement in word error rate in comparison to prior systems.

Figure 1:
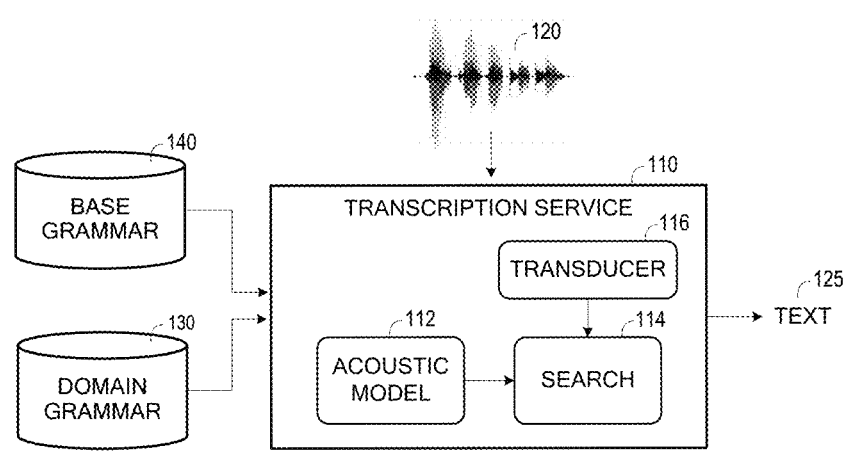
FIG. 1 is a block diagram of a system to transcribe audio using a base grammar and a domain grammar.

FIG. 1 illustrates transcription service 110. Each illustrated component may be implemented by one or more computing systems, including distributed storage and/or distributed processing nodes. According to some embodiments, one or more of the components may be implemented by one or more virtual machines provisioned in an ad-hoc manner in a cloud-based architecture.

Transcription service 110 operates to receive audio 120 and generate text 125 based thereon. According to some embodiments, acoustic model 112 extracts features from a frame of audio 120 and generates posteriors corresponding to each of a set of phones, with each posterior indicating the probability that the frame includes its associated phone. The phones may be context-dependent as is known in the art. Embodiments are not limited to acoustic models exhibiting this or similar functionality. Search component 114 receives the output of acoustic model 112 and applies transducer 116 thereto, resulting in text 125.

Base grammar 140 may comprise a generic or general language model (e.g., an n-gram model) as is known in the art. Base grammar 140 may be associated with (i.e., designed to decode speech of) any collection of individuals, such as but not limited to the general population, the population of a particular geographic region, and the population of a particular company. Domain grammar 130 is tailored to a smaller and/or different population than base grammar 140 and includes words and/or phrases which are not represented in base grammar 140. For example, base grammar 140 may be associated with a company and domain grammar 130 may be associated with a particular meeting between employees of the company.

Transducer 116 is generated based on base grammar 140 and domain grammar 130 as will be described below. According to some embodiments, the generation of transducer 116 based on base grammar 140 and domain grammar 130 may occur significantly faster than prior systems. Accordingly, some embodiments may be suitable for use in scenarios where domain grammar 130 is available only shortly before audio 120 to be transcribed is received.

Figure 2A:
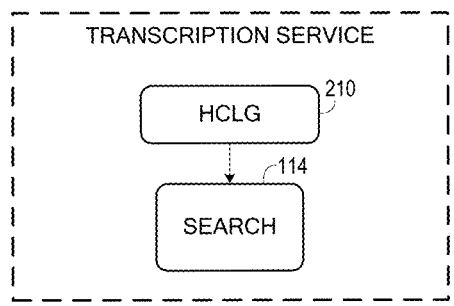
FIGS. 2A and 2B are block diagrams of respective systems to transcribe audio.

In contrast to the embodiments of the present invention, described herein, FIG. 2A illustrates a known system in which transducer 116 is implemented using weighted finite-state transducer 210. Transducer 210 is a composition of H, C, L and G transducers, and therefore produces the same output as if the H, C, L and G transducers were applied sequentially. Briefly, the H transducer represents context-dependent phone hidden Markov models and converts a sequence of acoustic model outputs to a sequence of context-dependent phones. The C transducer converts the sequence of context-dependent phones to a sequence of context-independent phones. The L transducer describes the lexicon and converts sequences of context-independent phones into word sequences, and the G transducer applies a grammar cost to the word sequences.

Composition of a grammar G including a base grammar and a domain-specific grammar, followed by composition of transducer G with an HCL transducer, requires substantial disk space, processing power and memory. Full static composition of HCLG transducer 210 as shown in FIG. 2A is therefore unsuitable for use in transcription tasks in which a domain-specific grammar becomes available shortly before transcription.

Figure 2B:
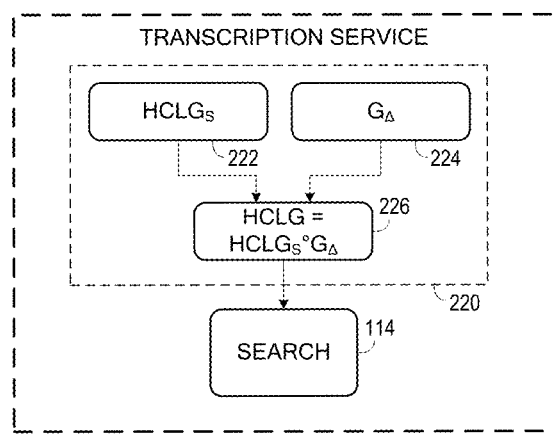

FIG. 2B depicts yet another known system to describe audio. FIG. 2B replaces transducer 210 of FIG. 2A with transducer 220. First, a large grammar G (e.g., the interpolation of a base grammar and a domain grammar) is factored into small grammar $G_S$ and delta grammar $G_\Delta$ 224 such that $G=G_S \circ G_\Delta$. The small grammar $G_S$ is composed with H, C and L transducers offline to create $HCLG_S$ 222. Since $G_S$ is significantly smaller than G, it may be feasible to compose and optimize $HCLG_S$ transducer 222 offline.

During transcription, $HCLG_S$ 222 is dynamically composed with $G_\Delta$ 224 to generate HCLG 226. While the FIG. 2B system may be capable of handling large grammars which cannot be efficiently handled by the FIG. 2A system, the FIG. 2B system is unsuitable for use in many scenarios due to the amount of time required to compute small grammar $G_S$ and delta grammar $G_\Delta$ from large grammar G. For example, some applications require domain adaptation to be performed within a few hundred milliseconds, while the FIG. 2B approach would typically consume many minutes or hours.

Figure 3:
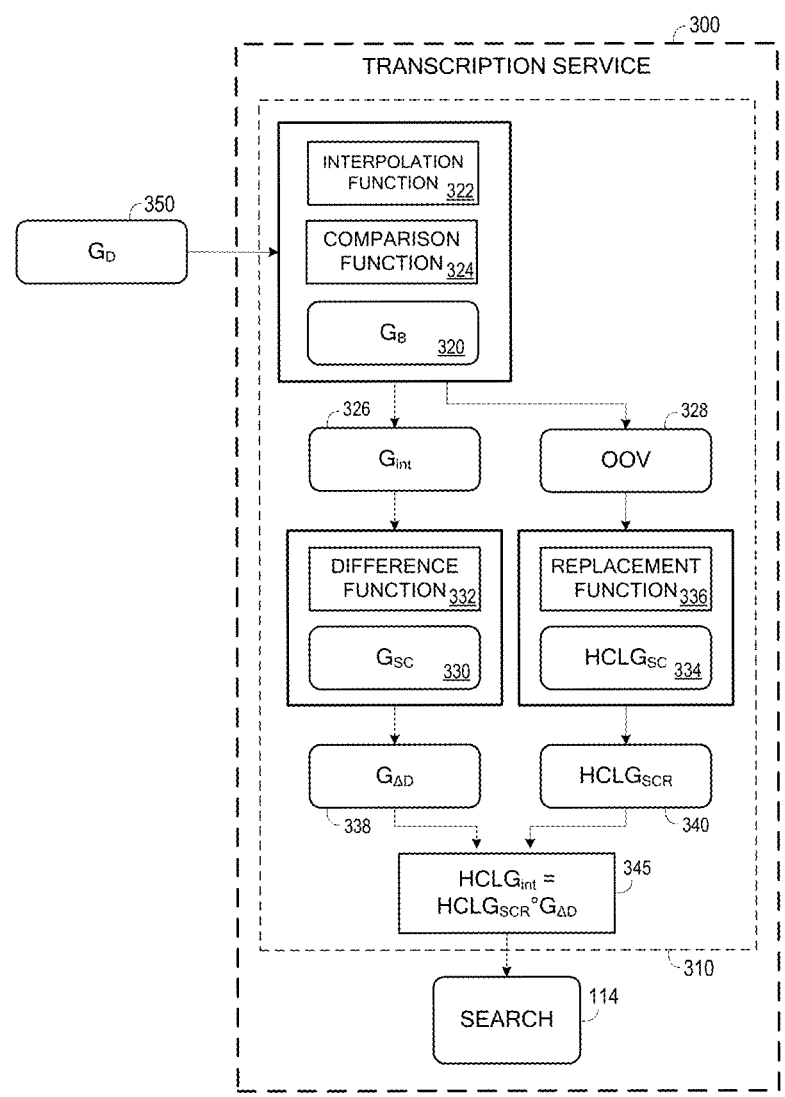
FIG. 3 is a detailed block diagram of transcription service to transcribe audio using a base grammar and a domain grammar according to some embodiments.

FIG. 3 illustrates transcription service 300 according to some embodiments of the invention disclosed herein. Transcription service 300 includes transducer 310, which may comprise an implementation of transducer 116 of FIG. 1. Generally, transducer 310 operates to augment $HCLG_{SC}$ 334 with out-of-vocabulary (OOV) words 328, and to create domain delta grammar $G_{AD}$ 338 such that dynamic composition of $G_{AD}$ 338 with the augmented $HCLG_{SC}$ 334 will produce $HCLG_{int}$ 345 including interpolated grammar $G_{int.326'}$ Domain delta grammar $G_{AD}$ 338 is created after reception of domain grammar $G_D$ 350, and is created based on augmented grammar $G_{SC}$ 330. Advantageously, augmented grammar $G_{SC}$ 330 is generated based on base grammar $G_B$ 320 and is stored prior to acquisition of domain grammar $G_D$ 350. Similarly, composed transducer $HCLG_{SC}$ 334, allowing for insertion of an out-of-vocabulary class, is generated based on augmented grammar $G_{SC}$ 330 and stored prior to acquisition of domain grammar $G_D$ 350. By creating and storing these data structures prior to receipt of the domain grammar, and utilizing the pre-stored data structures in conjunction with the received domain grammar as described above, some embodiments are able to provide domain grammar-based transcription shortly after receipt of the domain grammar, and without requiring unsuitable amounts of memory or processing power.

Therefore, and in contrast to the systems depicted in FIGS. 2A and 2B, transducer 310 operates dynamically during decoding and allows for near-immediate use of received domain grammar $G_D$ 350. Moreover, for a same domain grammar $G_D$, some embodiments exhibit an 80-85% improvement in word error rate in comparison to systems such as that shown in FIG. 2B. Operation of transducer 310 in accordance with some embodiments will be described in detail with respect to FIG. 5.

Figure 4:
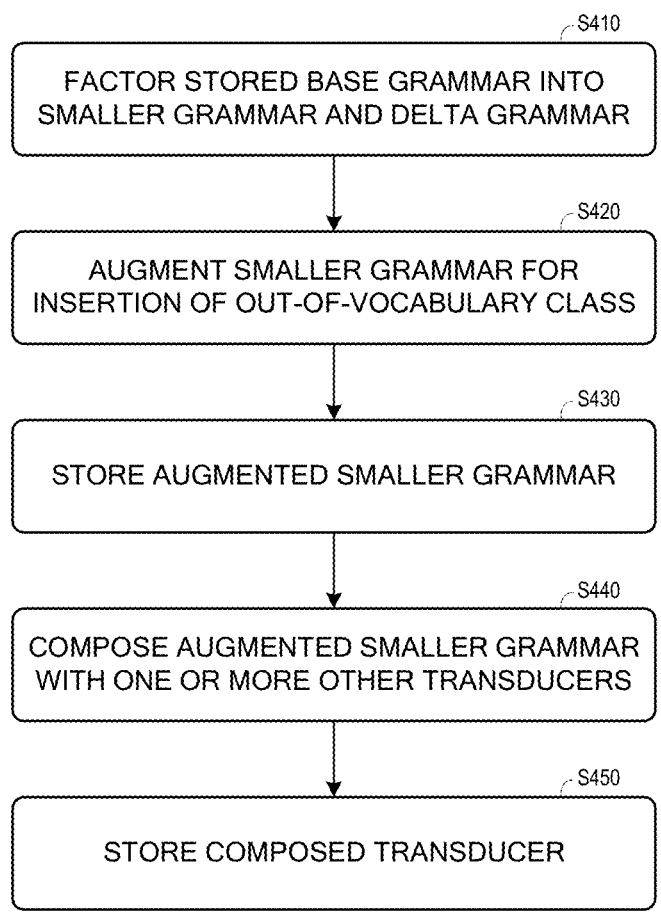
FIG. 4 is a flow diagram of a process to prepare for audio transcription using a base grammar and a domain grammar according to some embodiments.

FIG. 4 is a flow diagram of process 400 to prepare data structures 330 and 340 according to some embodiments. A stored base grammar is factored into a smaller grammar and a delta grammar at S410. The stored base grammar may comprise an n-gram model for providing transcription in generic scenarios. The factoring generates grammar $G_S$ and delta grammar $G_\Delta$ from base grammar $G_B$ such that $G_B=G_S \circ G_\Delta$.

The smaller grammar is augmented at S420 for insertion of an OOV class. In some embodiments, S420 comprises transforming n-gram grammar $G_S$ into class-based language model $G_{SC}$ which allows insertion of a special OOV class in any context. $G_{SC}$ is created by inserting one outgoing arc with a nonterminal OOV class symbol in every context (i.e., state fanout) of transducer $G_S$.

Figure 5A:
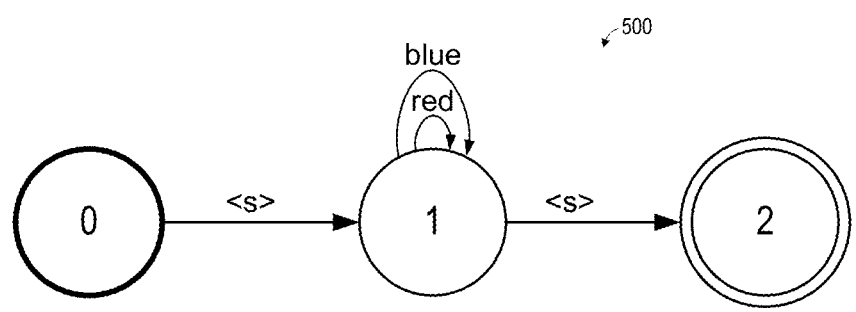
FIGS. 5A and 5B illustrate transformation of a smaller grammar factored from a base grammar into an augmented smaller grammar according to some embodiments.
Figure 5B:
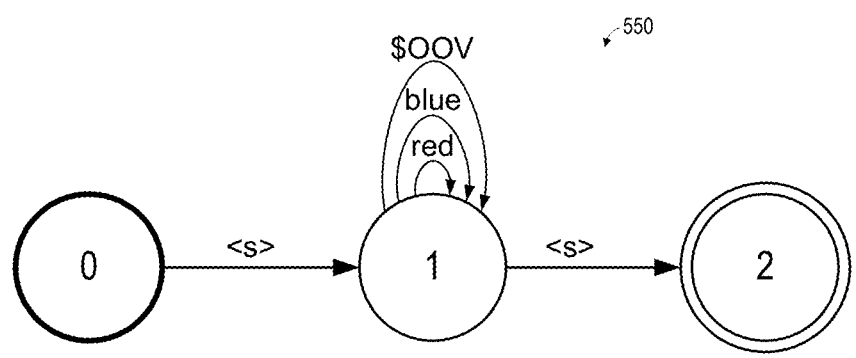

FIGS. 5A and 5B illustrate S420 according to some embodiments. As described above, finite state transducer $G_S$ 500 was factored from a base grammar $G_B$ such that $G_B=G_S \circ G_\Delta$ (not shown). $G_S$ 500 represents a unigram grammar in ARPA language model format and including the two words "red" and "blue".

FIG. 5B illustrates transformation of $G_S$ 500 into class-based language model $G_{SC}$ 550 which allows insertion of a special OOV class in any context. As shown, one outgoing arc with a nonterminal OOV class symbol ($OOV) has been inserted in every state fanout of $G_S$ 500. Since $G_S$ 500 can't model context after OOV words, the inserted arcs point to the unigram context state. The resulting grammar $G_{SC}$ 550 allows for insertion of an OOV class with a constant predefined penalty. Augmented smaller grammar $G_{SC}$ is then stored at S430.

Augmented small grammar $G_{SC}$ is composed with one or more other transducers at S440. The one or more other transducers may comprise any one or more other transducers which, when applied in sequence, transform the output of an acoustic model to a form suitable for input to $G_{SC}$. According to some embodiments, the one or more transducers comprise H, C, and L transducers as described above and as known in the art, but embodiments are not limited thereto. According to the present example, the resulting composed transducer $HCLG_{SC}$ is also stored for use during subsequent decoding as will be described below.

Transducer 310 of FIG. 3 includes pre-stored base grammar $G_B$ 320, augmented small grammar $G_{SC}$ 330, and composed transducer HCLG$_{SC}$ 334, the latter two of which may be generated and stored prior to decoding as described above. Also stored prior to decoding is software code which is executable to provide several functions which are performed during decoding. The functions include interpolation function 322, comparison function 324, difference function 332, replacement function 336 and dynamic composition 345. These functions are presented as individual components adjacent to the data structures on which they respectively operate, but embodiments are not limited thereto. For example, a single piece of software may perform all the functions and may be stored remote from the pre-stored data structures.

Figure 6:
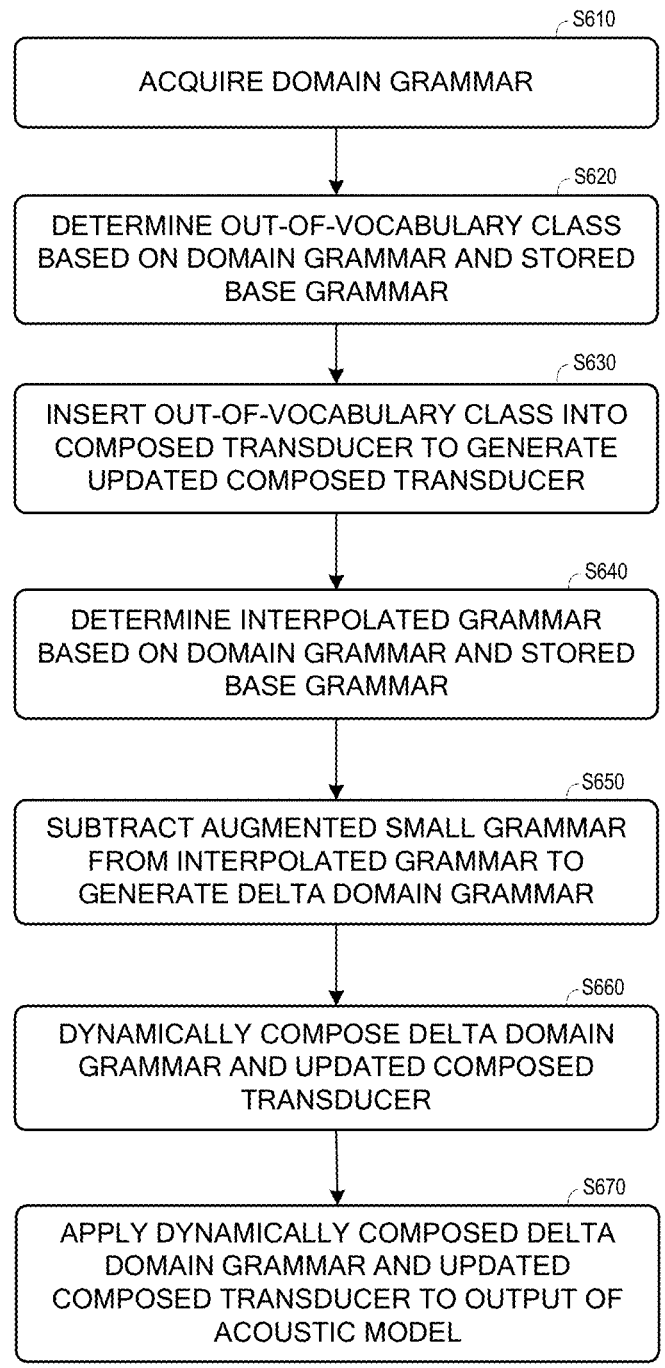
FIG. 6 is a flow diagram of a process to transcribe audio using a base grammar and a domain grammar according to some embodiments.

Continuing to runtime operation of transducer 310, a domain grammar is acquired at S610 of FIG. 6. The domain grammar may be generated by or received from any suitable system. The domain grammar may comprise an n-gram model as is known in the art. In some embodiments as will be described below, the domain grammar is based on e-mail data of meeting participants. The received domain grammar is depicted as domain grammar G$_D$ 350 in the FIG. 3 example.

At S620, an OOV class is determined based on the domain grammar and the stored based grammar. Comparison function 324 may generate OOV class 328 at S620 by comparing stored base grammar G$_B$ 320 with received domain grammar G$_D$ 350, and identifying words which are represented only in domain grammar G$_D$ 350. According to some embodiments, acquisition of the domain grammar at S610 and determination of the OOV class S620 occur just prior to decoding. In some applications, S610 and S620 are required to be completed within a few hundred milliseconds.

Figure 7:
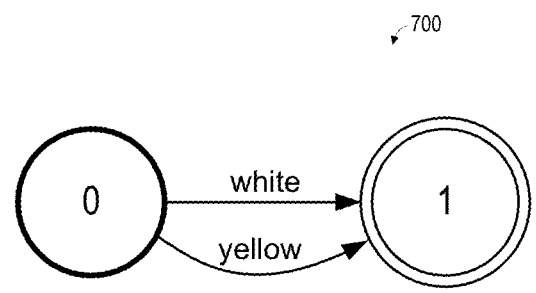
FIG. 7 illustrates an out-of-vocabulary class generated by comparing a base grammar with a domain grammar according to some embodiments.

FIG. 7 illustrates an OOV class generated at S620 according to some embodiments. Finite state transducer 700 represents one possible OOV class including domain-only words "white" and "yellow".

Figure 8:
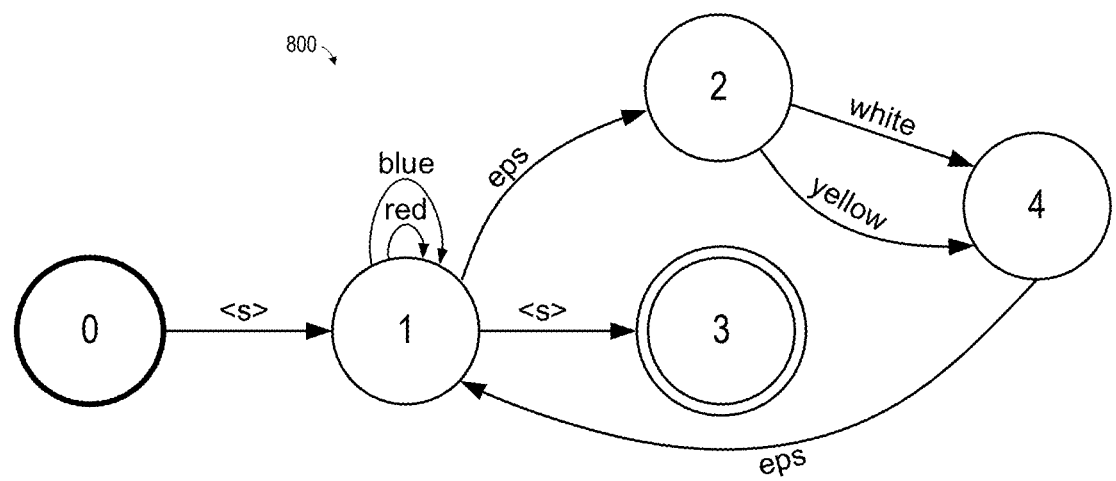
FIG. 8 illustrates an updated composed transducer created by replacing a nonterminal out-of-vocabulary arc in an augmented smaller grammar with an out-of-vocabulary class according to some embodiments.

At S630, the OOV class is inserted into the prestored composed transducer to generate an updated composed transducer. In some embodiments, replacement function 336 implements a known weighted finite-state transducer replacement function at S630 to replace the nonterminal OOV arc in HCLG$_{SC}$ with OOV class 328 representing OOV words on-demand at runtime. This replacement injects the OOV words into augmented small grammar G$_{SC}$ and thereby creates updated composed transducer HCLG$_{SCR}$ 345. Continuing the present example, FIG. 8 illustrates the replacement of the nonterminal OOV arc in G$_{SC}$ 550 with OOV class 700 according to some embodiments.

An interpolated grammar is determined at S640 based on the domain grammar and a stored base grammar. With respect to FIG. 3, interpolation function 322 determines interpolated grammar G$_{int}$ 326 based on received domain grammar G$_D$ 350 and stored base grammar G$_B$ 320. According to some embodiments, S640 comprises a simple linear interpolation in which, the overall likelihood P(w|h) of a word w occurring after the history h is computed as the arithmetic average of P(w|h) for each of domain grammar G$_D$ 350 and stored base grammar G$_B$ 320. S640 may comprise any suitable interpolation method, including but not limited to log-linear interpolation.

The cost of previously-determined augmented small grammar G$_{SC}$ is subtracted from the cost of interpolated grammar G$_{int}$ at S650 to generate delta domain grammar G$_{AD}$. Generally, a transition cost of delta domain grammar G$_{AD}$ for a given next word w and history H is computed by subtracting the cost of G$_{SC}$ from the cost of G$_{int}$ (for w and H). This subtraction occurs on-demand so the only delta domain grammar G$_{AD}$ costs which are determined are those costs which correspond to w and H pairs that are taken into consideration by the search algorithm.

According to some embodiments of S650, delta domain grammar G$_{AD}$ is dynamically generated by subtracting the cost of augmented small grammar G$_{SC}$ and adding the cost of grammar G$_{int}$ during decode as follows:

$$C_{AC}(w|H) = -C_{SC}(w|H) + C_{int}(w|H)$$

where w represents a next word, H represents a word history, C$_{SC}$ represents cost from augmented small grammar G$_{SC}$, and C$_{int}$ represents cost of interpolated grammar G$_{int}$.

Similarly, the interpolated grammar cost can be computed by using a linear or log linear model (C$_{int}$(w|H)=$\lambda$C$_B$(w|H)+ (1−$\lambda$)C$_C$(w|H)), or a log-linear model (C$_{int}$(w|H)=−log(− $\lambda$*exp(C$_B$(w|H))−(1−$\lambda$)*exp(C$_C$(w|H)))), where $\lambda$ represents interpolation weight, C$_B$ represents base grammar cost, and C$_C$ represents contextual grammar cost.

At S660, the delta domain grammar G$_{AD}$ is dynamically composed with the updated composed transducer as is known in the art, and the dynamic composition is applied to the output of an acoustic model at S670 to generate a transcription. The dynamic composition is illustrated at 345 and results in a graph equivalent to transducer HCLG$_{int}$. As described above, search component 114 applies transducer HCLG$_{int}$ to the acoustic model output. Moreover, unlike FIG. 2B, the components of the dynamic composition are not pre-computed and persisted on disk but are instead programmatically created on-demand from pre-stored (smaller) data structures and a received domain grammar.

S630 through S670 are executed during decoding, and may be implemented as on-demand algorithms. For example, determination of the interpolated grammar at S640 does not include computation of all interpolated grammar weights at once. Rather, the determination computes interpolated weights on-demand only for those hypotheses that the search algorithm takes into consideration during decoding.

Figure 9:
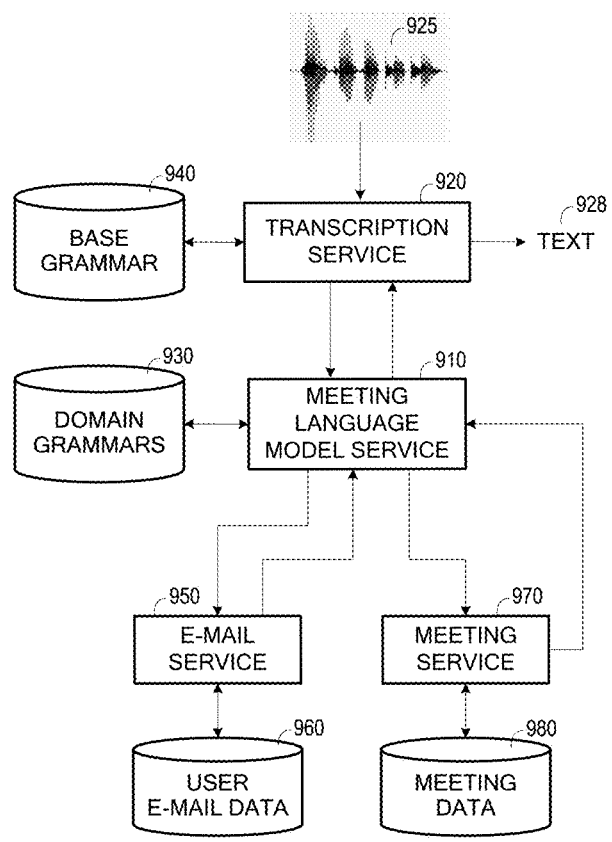
FIG. 9 is a block diagram of a domain-specific transcription system according to some embodiments.

FIG. 9 illustrates a system architecture utilizing a transcription service according to some embodiments. Generally, meeting language model service 910 provides transcription service 920 with a domain grammar from among domain grammars 930. Transcription service 920 uses base grammar 940 and the received domain grammar to transcribe audio 925 of an associated meeting as described above.

In order to generate a domain grammar according to some embodiments, meeting language model service 910 communicates with meeting service 970 to receive meeting information for a particular meeting from meeting data 980. Meeting service 970 may comprise any suitable meeting/ calendaring service. The meeting information received from meeting service 970 may include a meeting calendar item associated with the particular meeting to be transcribed. Such a calendar item may include names of the meeting organizer and every meeting participant, the meeting subject, the meeting description, and the content of any documents associated with the meeting. The meeting information may also include names of people with whom meeting participants most often collaborate, documents generated by meeting participants, chat sessions that include meeting participants, and any other meeting- or meeting participant- related information.

Based on the list of meeting participants received from meeting service 970, meeting language model service 910 may communicate with e-mail service 950 to receive e-mail data associated with each meeting participant from user e-mail data 960. E-mail service 950 may comprise any suitable system providing an e-mail service. A single service may provide meeting and e-mail services in some embodiments.

Meeting language model service 910 generates a domain grammar based on the received meeting information and the received e-mail information. Meeting language model service 910 may store the domain grammar in domain grammars 930 in association with an identifier of the meeting. Accordingly, transcription service 920 may receive an instruction to provide transciption services for a particular meeting, and may then use an identifier of the particular meeting to retrieve an associated domain grammar from domain grammars 930.

Figure 10:
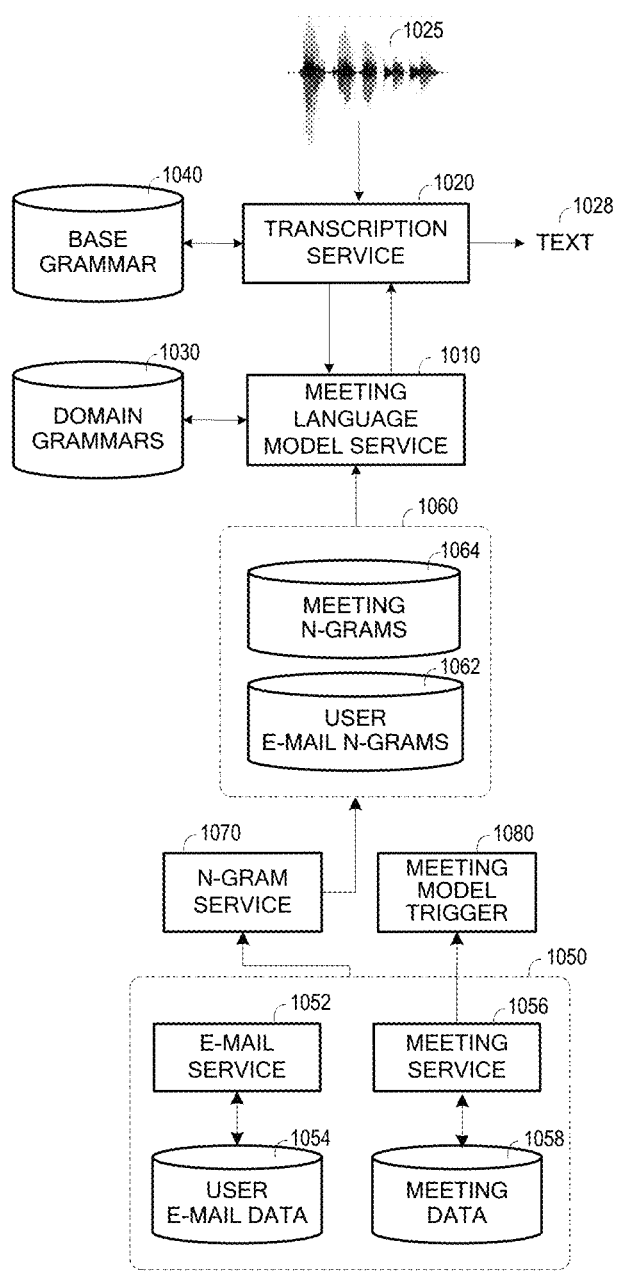
FIG. 10 is a block diagram of a domain-specific transcription system according to some embodiments.

FIG. 10 illustrates a system to generate domain grammars for transcription as described above. The system of FIG. 10 may comprise a specific implementation of the system of FIG. 9, but embodiments are not limited thereto.

According to the FIG. 10 system, meeting language model service 1010 generates domain grammars 1030 based on n-grams 1060. n-grams 1060 include user e-mail n-grams 1062 and meeting n-grams 1064. An n-gram as referred to herein is a model which assigns probabilities to the sequences of words. An n-gram model may be used to predict the occurrence of a word based on the occurrence of a previous n−1 words.

n-gram service 1070 may, periodically or on-demand, communicate with e-mail service 1052 to retrieve e-mail data 1054 of various users (e.g., those users who are registered for transcription and/or eligible to participate in teleconferences). In some embodiments, n-gram service 1070 also retrieves documents associated with the various users. n-gram service 1070 may generate n-gram models for each of such users based on the retrieved data using any system for generating n-gram models which is or becomes known. These n-gram models may be stored among user e-mail n-grams 1062 in association with identifiers of corresponding users for later on-demand retrieval by meeting language model service 1010. According to some embodiments, n-gram service 1070 periodically updates n-gram models associated with various users based on new user e-mail data retrieved from e-mail service 1052.

n-gram service 1070 may also, periodically or on-demand, communicate with meeting service 1056 to retrieve meeting data 1058 associated with various meetings defined within meeting data 1058. As described above, the meeting data 1058 may include names of the meeting participants and their meeting roles, the meeting subject, the meeting description, the content of any documents associated with the meeting, names of people with whom meeting participants most often collaborate, documents generated by meeting participants, chat sessions that include meeting participants, and any other meeting- or meeting participant-related information. n-gram service 1070 may generate n-gram models for the various meetings using any system for generating n-gram models which is or becomes known. These meeting n-gram models may be stored among meeting n-grams 1064 in association with identifiers of the corresponding meetings, such that the models may be retrieved on-demand by meeting language model service 1010.

According to some embodiments, meeting model trigger 1080 communicates with meeting service 1056 to identify upcoming meetings. If a meeting is identified which is scheduled to begin within a certain threshold time (e.g., 10 minutes from the present time), meeting model trigger 1080 transmits a message to meeting language model service 1010 to begin FIG. 6 process with respect to the domain grammar corresponding to the meeting. As a result, dynamic composition of S660 is ready to be performed at the commencement of the meeting.

Meeting language model service 1010 generates domain grammars based on meeting n-grams 1064 and user e-mail n-grams 1062. In some embodiments, meeting language model service 1010 uses meeting data 1058 of a meeting to identify individual email n-grams 1062 which correspond to the meeting participants, and to identify a meeting n-gram 1064 which corresponds to the meeting. The identified n-grams are merged into a single set of n-grams using any suitable techniques which are or become known. Next, an ARPA language model is built from the merged n-gram model using any suitable technique which are or become known.

Figure 11:
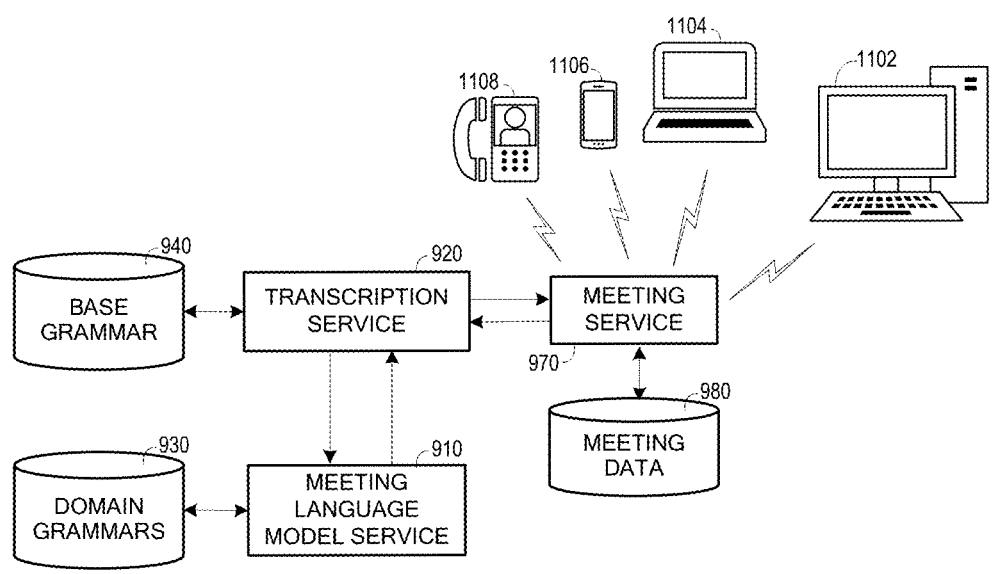
FIG. 11 is a block diagram of a system to utilize a domain grammar and a base grammar for meeting transcription according to some embodiments.

FIG. 11 illustrates a system for describing operation during a meeting according to some embodiments. The FIG. 11 system includes elements of FIG. 9 for purposes of example; these elements may be substituted for similarly-named elements of the FIG. 10 system.

It will be assumed that a meeting has been created and defined in data of meeting data 980. The data of the meeting may be associated with a meeting identifier in meeting data 980. The data of the meeting may include connection and authentication information.

On or around a designated meeting start time, meeting participants operate respective client devices 1102-1108 to communicate with meeting service 970 and join the meeting. In response, meeting service 970 may pass the meeting identifier to transcription service 920 and request transcription of audio associated with the meeting.

In response, transcription service 920 may request a domain grammar associated with the meeting. For example, transcription service 920 may pass an identifier of the meeting to meeting language model service 910 along with a request for a corresponding domain grammar. If it is determined that no domain grammar is available (e.g., meeting language model service 910 returns an error or other negative response), transcription service 920 transcribes audio received from meeting service 970 using a base grammar 940. If meeting language model service 910 returns a domain grammar corresponding to the meeting, transcription service 920 transcribes audio received from meeting service 970 using the domain grammar as described with respect to FIGS. 3 and 6.

A resulting transcription may be stored in association with an identifier of the meeting for future access. For example, transcription service 920 may transmit a file including text of the audio to meeting service 970. Meeting service 970 may store the file in association with the meeting identifier within meeting data 980. The stored file may then be accessed by the meeting organizer, meeting participants, and/or any other set of users to whom access is granted.

According to some embodiments, more than one domain grammar may be applicable to a meeting. The applicable domain grammars may be associated with various degrees of specificity to the meeting. For example, domain grammars 630 may include a domain grammar generated based only on the meeting data and not based on participant e-mail data, or a domain grammar based on meeting data of one or more previous meetings including the same meeting participants. Meeting language model service 910 may provide one or more of such applicable domain grammars to transcription service 930 in some embodiments. If more than one domain grammar is provided, transcription service 930 may combine these grammars using offline and online interpolation techniques, associating higher weights to the more specific and thus more relevant models. If transient failures occur during the use of the combined grammars, transcription service 930 may fall back to the base grammar.

Figure 12:
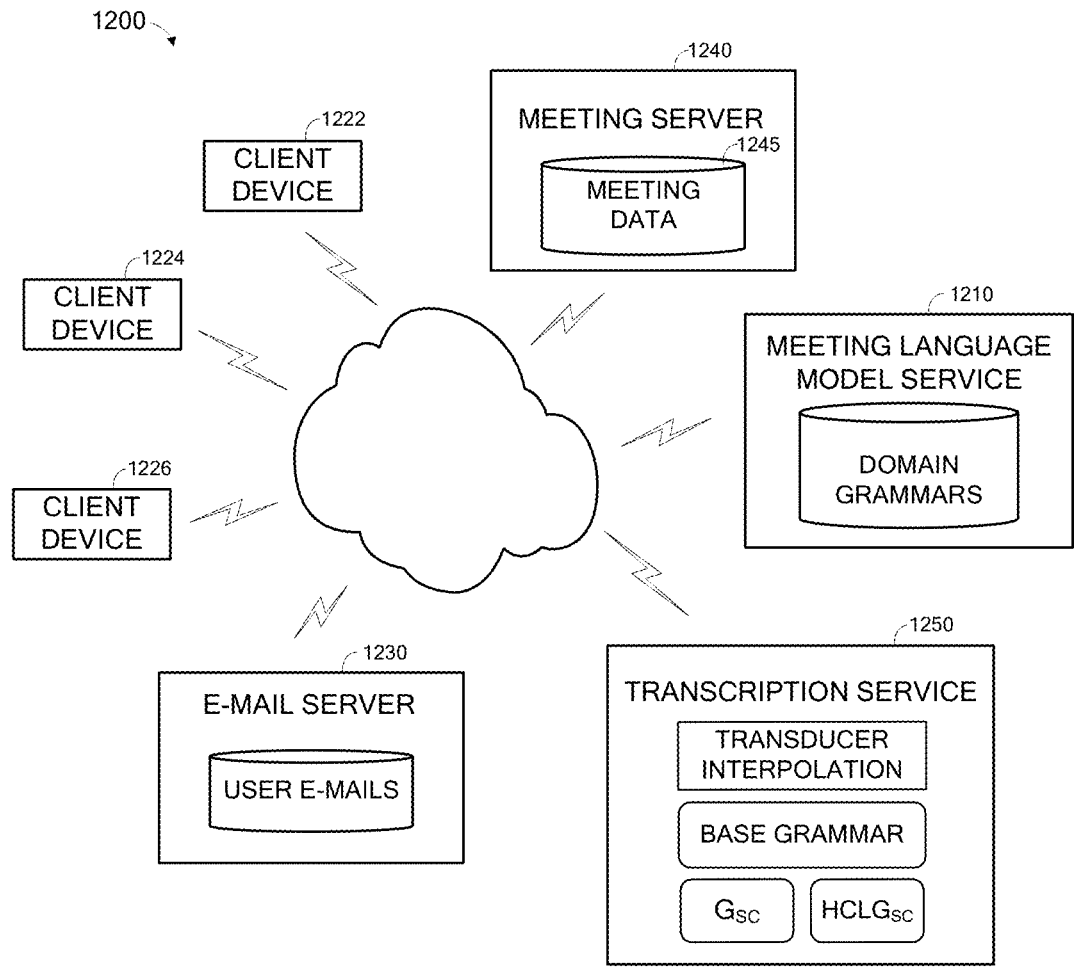
FIG. 12 is a block diagram of a cloud-based architecture providing transcription based on domain grammars according to some embodiments.

FIG. 12 illustrates distributed system 1200 according to some embodiments. System 1200 may be cloud-based and components thereof may be implemented using on-demand virtual machines, virtual servers and cloud storage instances. As shown, meeting language model service 1210 may be implemented as a cloud service providing domain grammars to other services such as transcription service 1250.

Meeting participants operate respective client devices 1222-1226 to communicate with meeting server 1240 and join a meeting defined within meeting data 1245. In response, meeting server 1240 requests transcription of the meeting audio from transcription service 1250 and includes an identifier of the meeting in the request. Transcription service 1220 may pass the identifier to meeting language model service 1210 to request a corresponding domain grammar.

Meeting language model service 1210 returns a domain grammar corresponding to the meeting. The returned domain grammar may be previously-generated based on the meeting data associated with the meeting and on user e-mail data associated with the meeting participants and retrieved from e-mail server 1230, as described herein. Transcription service 1250 dynamically composes a transducer based on the returned domain grammar and on a pre-stored base grammar, augmented small grammar and a composed transducer, receives meeting audio from meeting server 1240, and transcribes the audio using the dynamically-composed transducer. The transcribed audio may be stored in meeting data 1245 in association with the meeting.

Figure 13:
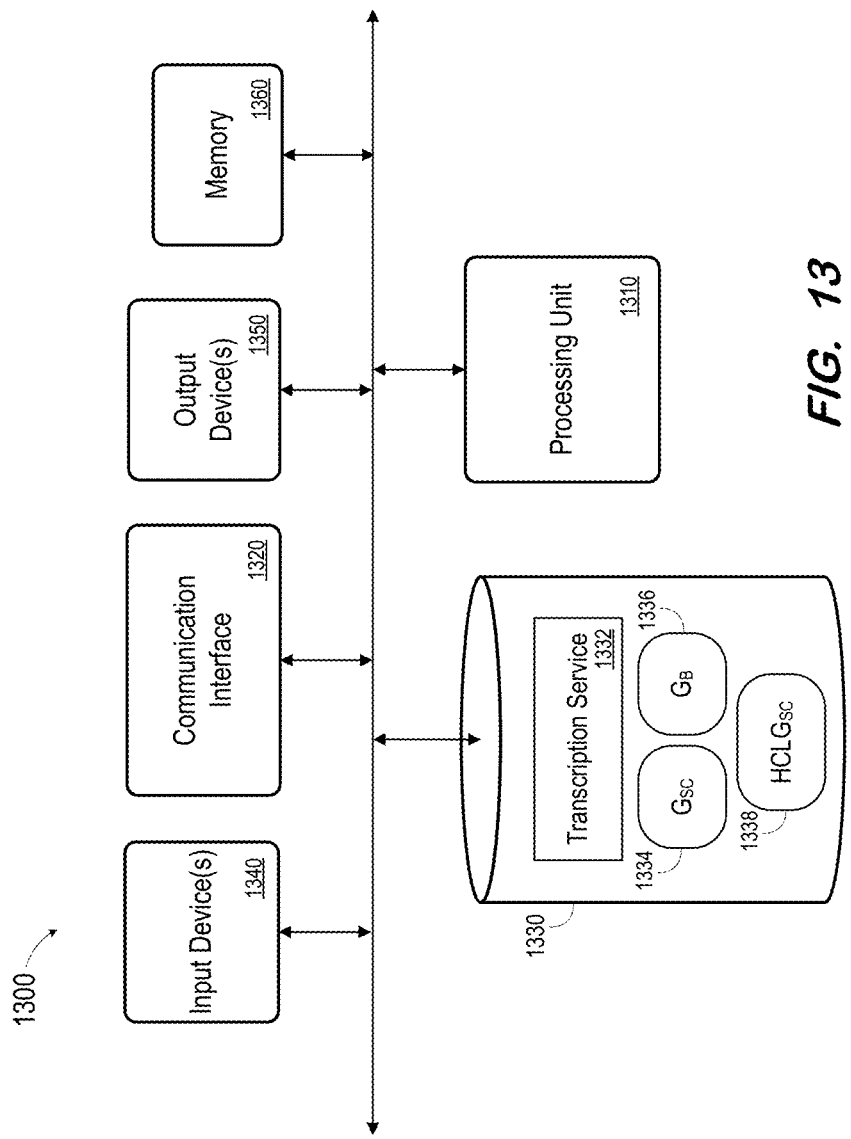
FIG. 13 is a block diagram of a computing system according to some embodiments.

FIG. 13 is a block diagram of system 1300 according to some embodiments. System 1300 may comprise a general-purpose server computer and may execute program code to provide audio transcription as described herein. System 1300 may be implemented by a cloud-based virtual server according to some embodiments.

System 1300 includes processing unit 1310 operatively coupled to communication device 1320, persistent data storage system 1330, one or more input devices 1340, one or more output devices 1350 and volatile memory 1360. Processing unit 1310 may comprise one or more processors, processing cores, etc. for executing program code. Communication interface 1320 may facilitate communication with external devices, such as client devices and data providers as described herein. Input device(s) 1340 may comprise, for example, a keyboard, a keypad, a mouse or other pointing device, a microphone, a touch screen, and/or an eye-tracking device. Output device(s) 1350 may comprise, for example, a display (e.g., a display screen), a speaker, and/or a printer.

Data storage system 1330 may comprise any number of appropriate persistent storage devices, including combinations of magnetic storage devices (e.g., magnetic tape, hard disk drives and flash memory), optical storage devices, Read Only Memory (ROM) devices, etc. Memory 1360 may comprise Random Access Memory (RAM), Storage Class Memory (SCM) or any other fast-access memory.

Transcription service 1332 may comprise program code executed by processing unit 1310 to cause system 1300 to transcribe audio based on dynamically-composed transducers as described herein. Such dynamic composition may be based on a received domain grammar and on a pre-stored base grammar, augmented small grammar and composed transducer as described herein. Data storage device 1330 may also store data and other program code for providing additional functionality and/or which are necessary for operation of system 1300, such as device drivers, operating system files, etc.

Each functional component and process described herein may be implemented at least in part in computer hardware, in program code and/or in one or more computing systems executing such program code as is known in the art. Such a computing system may include one or more processing units which execute processor-executable program code stored in a memory system.

Processor-executable program code embodying the described processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Embodiments are not limited to the examples described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Those in the art will appreciate that various adaptations and modifications of the above-described embodiments can be configured without departing from the claims. Therefore, it is to be understood that the claims may be practiced other than as specifically described herein.

What is claimed is:
1. A system comprising:
    a memory storing processor-executable process steps; and
    a processing unit to execute the processor-executable process steps to cause the system to:
    store an augmented first grammar generated based on a base grammar, the augmented first grammar allowing for insertion of an out-of-vocabulary class;
    store a composed transducer composed of the augmented first grammar and one or more other transducers;
    acquire a domain grammar after storage of the augmented first grammar and the composed transducer;
    in response to acquisition of the domain grammar:
    determine an interpolated grammar based on the domain grammar and a base grammar;
    determine a difference in cost between the interpolated grammar and the augmented first grammar to determine a delta domain grammar;
    determine a first out-of-vocabulary class based on the domain grammar and the base grammar;
    insert the first out-of-vocabulary class into the composed transducer to generate an updated composed transducer; and
    compose the delta domain grammar and the updated composed transducer; and apply the composition of the delta domain grammar and the updated composed transducer to an output of an acoustic model.

2. A system according to claim 1, the processing unit to execute the processor-executable process steps to cause the system to:
decompose the base grammar into a first grammar and a delta grammar;
augment the first grammar for insertion of an out-of-vocabulary class to generate the augmented first grammar;
compose the augmented first grammar and the one or more other transducers to generate the updated composed transducer; and
store the base grammar, the augmented first grammar and the updated composed transducer prior to receiving the domain grammar.

3. A system according to claim 2 wherein augmenting of the first grammar for insertion of an out-of-vocabulary class comprises:
insertion of one outgoing arc with a non-terminal out-of-vocabulary class symbol in every state fanout of the first grammar.

4. A system according to claim 1, wherein determination of the delta domain grammar comprises subtracting a cost of the augmented first grammar from a cost of the interpolated grammar.

5. A system according to claim 1, the processing unit to execute the processor-executable process steps to cause the system to:
determine meeting data associated with a meeting:
determine a plurality of meeting participants based on the meeting data;
determine e-mail data associated with each of the plurality of meeting participants; and
generate the domain grammar based on the e-mail data and the meeting data.

6. A system according to claim 5, wherein the acoustic model receives audio associated with the meeting.

7. A system according to claim 2, wherein the base grammar is stored prior to reception of the domain grammar.

8. A computer-implemented method comprising:
storing an augmented first grammar generated based on a base grammar, the augmented first grammar allowing for insertion of an out-of-vocabulary class;
storing a composed transducer composed of the augmented first grammar and one or more other transducers;
receiving a domain grammar after storage of the augmented first grammar and the composed transducer;
in response to reception of the domain grammar:
determining an interpolated grammar based on the domain grammar and the base grammar;
determining a cost difference between the interpolated grammar and the augmented first grammar to determine a delta domain grammar;
determining a first out-of-vocabulary class based on a comparison between the domain grammar and the base grammar;
inserting the first out-of-vocabulary class into the composed transducer to generate an updated composed transducer; and
dynamically composing the delta domain grammar and the updated composed transducer; and
performing speech recognition using the dynamic composition of the delta domain grammar and the updated composed transducer.

9. A method according to claim 8, further comprising:
decomposing the base grammar into a first grammar and a delta grammar;
augmenting the first grammar for insertion of an out-of-vocabulary class to generate the augmented first grammar;
composing the augmented first grammar and the one or more other transducers to generate the updated composed transducer; and
storing the base grammar, the augmented first grammar and the updated composed transducer prior to receiving the domain grammar.

10. A method according to claim 9, wherein augmenting the first grammar for insertion of an out-of-vocabulary class comprises:
inserting one outgoing arc with a non-terminal out-of-vocabulary class symbol in every state fanout of the first grammar.

11. A method according to claim 8, wherein determining the delta domain grammar comprises subtracting a cost of the augmented first grammar from a cost of the interpolated grammar.

12. A method according to claim 8, further comprising:
determining meeting data associated with a meeting:
determining a plurality of meeting participants based on the meeting data;
determining e-mail data associated with each of the plurality of meeting participants; and
generating the domain grammar based on the e-mail data and the meeting data.

13. A method according to claim 12, wherein performing speech recognition comprises:
receiving audio associated with the meeting;
inputting the audio to an acoustic model; and
applying the dynamic composition of the delta domain grammar and the updated composed transducer to an output of the acoustic model.

14. A method according to claim 9, further comprising storing the base grammar prior to receiving the domain grammar.

15. A system comprising:
a meeting language model service to:
generate a domain grammar associated with a meeting; and
a transcription service to;
store an augmented first grammar generated based on a base grammar, the augmented first grammar allowing for insertion of an out-of-vocabulary class;
store a composed transducer composed of the augmented first grammar and one or more other transducers;
receive a domain grammar after storage of the augmented first grammar and the composed transducer;
in response to acquisition of the domain grammar:
determine an interpolated grammar based on the domain grammar and the base grammar;
determine a difference in cost between the interpolated grammar and the augmented first grammar to determine a delta domain grammar;
determine a first out-of-vocabulary class based on a comparison between the domain grammar and the base grammar;
insert the first out-of-vocabulary class into the composed transducer to generate an updated composed transducer; and
compose the delta domain grammar and the updated composed transducer; and perform speech recognition on audio of the meeting using the composition of the delta domain grammar and the updated composed transducer.

16. A system according to claim 15, the transcription service further to:
decompose the base grammar into a first grammar and a delta grammar;
augment the first grammar for insertion of an out-of-vocabulary class to generate the augmented first grammar;
compose the augmented first grammar and the one or more other transducers to generate the updated composed transducer; and
store the base grammar, the augmented first grammar and the updated composed transducer prior to receiving the domain grammar.

17. A system according to claim 16, wherein augmenting of the first grammar for insertion of an out-of-vocabulary class comprises:
insertion of one outgoing arc with a non-terminal out-of-vocabulary class symbol in every state fanout of the first grammar.

18. A system according to claim 15, wherein determination of the delta domain grammar comprises subtraction of a cost of the augmented first grammar from a cost of the interpolated grammar.

19. A system according to claim 15, the meeting language model service further to:
determine meeting data associated with the meeting:
determine a plurality of meeting participants based on the meeting data; and
determine e-mail data associated with each of the plurality of meeting participants,
wherein the domain grammar is generated based on the e-mail data and the meeting data.

20. A system according to claim 15, wherein performance of speech recognition comprises:
inputting the audio of the meeting to an acoustic model; and
applying the dynamic composition of the delta domain grammar and the updated composed transducer to an output of the acoustic model.

* * * * *